United States Patent Office 3,431,858
Patented Mar. 11, 1969

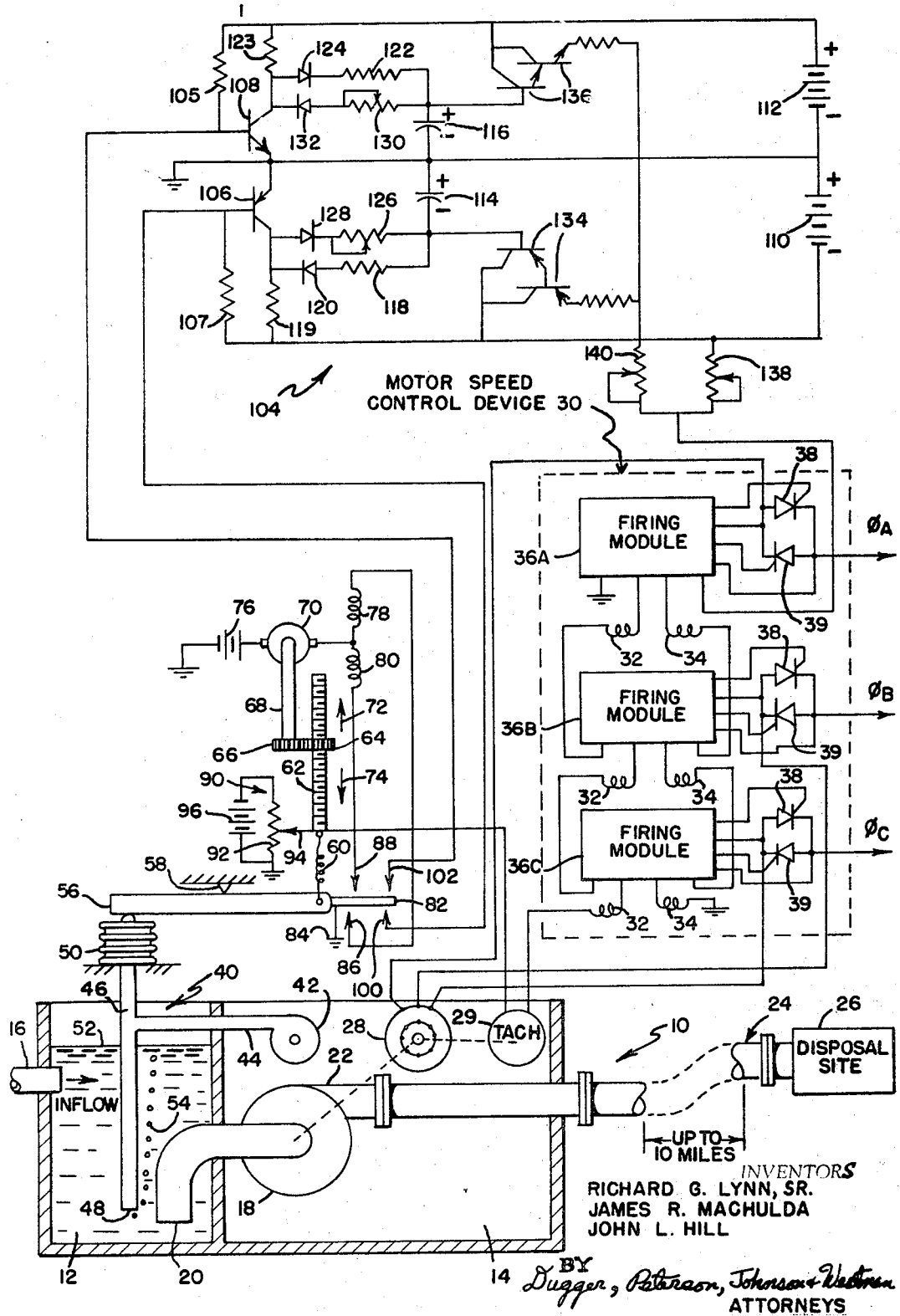

3,431,858
PUMPING SYSTEM WITH INERTIA
STABILIZATION
Richard G. Lynn, Sr., St. Paul, James R. Machulda, Minneapolis, and John L. Hill, St. Paul, Minn., assignors to Control Data Corporation, Minneapolis, Minn., a corporation of Minnesota
Filed Sept. 11, 1967, Ser. No. 666,844
U.S. Cl. 103—35          21 Claims
Int. Cl. F04b 49/02, 49/06

ABSTRACT OF THE DISCLOSURE

A controlled rate pumping system for pumping fluids which have significant inertial properties. The pumping means is driven by a speed controlled motor, which motor is controlled by a first control means which maintains equilibrium flow during steady-state conditions and a second control means which temporarily changes flow in exaggerated fashion in response to transient inertia effects.

BACKGROUND OF THE INVENTION

Field of the invention

This invention relates generally to pumping systems, and pertains more particularly to a system in which the conduit or main through which the liquid is forced is quite long. Hence, the invention will possess especial utility in conjunction with sewage and water systems.

Description of the prior art

There are two elemental types of pump speed control currently being employed for the control of variable speed pumps of the centrifugal variety:

The first of these types is controlled by two level detectors (in the case of a sewage system) or two pressure detectors (in the case of a water system) which by their adjustment establish an upper level or pressure value above which the pump speed is reduced at a fixed (but adjustable) rate, and a lower value below which the pump speed is increased at a fixed (but adjustable) rate. At levels or pressures between these upper and lower values, no change in pump speed is effected. This type of control is frequently termed "single-speed floating with dead-band."

The other basic type of system compares the actual level or pressure with a desired value and produces a pump speed greater or less than an arbitrary nominal speed by a simple algebraic function of the result of the comparison. In such a system, the change in pump speed that is required in response to a change in measured level or pressure is proportional to the deviation of the actual measured quantity from the desired value. This second type of system is usually termed "proportional" control.

SUMMARY OF THE INVENTION

In neither of the above control systems, nor in physical installations utilizing their philosophies, is there any provision for establishing the temporary conditions necessary for effectively accelerating the large fluid mass associated with a long closed conduit.

Accordingly, one object of the present invention is to utilize the basic teachings of either the fixed-speed floating system or the proportional control system but with the addition of a transient speed control that results in inertia stabilization that has been so manifestly lacking in the two prior art systems. Stated somewhat differently, it is an aim of this invention to return more rapidly to a correct pumping condition involving a well or storage tank and a relatively long conduit or main to its desired condition of pumping equilibrium in which the inflow to said well or tank is substantially equal to the outflow therefrom after a condition of flow non-equilibrium has been experienced in which there arises a certain disparity between the inflow and outflow.

The invention has for another object the provision of a pumping system possessing the above attribute that will be relatively inexpensive to produce and install.

A further object of the invention is to provide a system that is sufficiently compatible with pumping installations already in existence so that such existing systems can be readily modified to incorporate therein the teachings of the present invention and without requiring an objectionably long shutdown period for their conversion.

While, as already indicated, the invention can be employed in a municipal water supply system, the invention will herein be described in connection with a sewage system, only a brief reference hereinafter being made to a water supply system to enable those skilled in the pumping art to appreciate the problem common to both and to allow ready adaptation of our invention to both types of pumping systems. Briefly, a transducer, such as a potentiometer, is caused to assume a position representative of a desired pump speed. Since so-called bubblers are employed in wet wells, a bubbler can be utilized for adjusting the potentiometer to signify whether the level of the liquid in the wet well is too high or too low and thereby establishing an adjustment of pump speed that will correct the condition. A tachometer or its equivalent coupled to the electric motor that drives the pump provides a feedback signal indicative of the actual speed of the pump. This may be in the form of a pressure transducer connected to the pump. Assuming that a proportional type of control is used, the difference between the potentiometer voltage and the feedback voltage causes the pump to attain a speed which lessens the difference or error. However, although the pump speed is changed, the mass of liquid in the conduit or main does not immediately change its velocity; instead, there is a slip between the pump impeller and the liquid being pumped. Since the detection system does not sense a sufficient improvement, further corrective effort is made. However, when the inertia of the liquid contained in the conduit is finally overcome, the pump speed will be in excess of that required for maintaining the desired fluid velocity, and the detectors will quickly discover this condition of non-equilibrium and initiate an equivalent pump speed change of opposite algebraic sign.

To avoid this hunting for a condition of dynamic equilibrium, the present invention produces the transient pump speed conditions needed for accelerating and decelerating the liquid mass. Through the agency of an auxiliary resistor-capacitor circuit, the control exerted by the potentiometer and feedback signal, which are connected in opposition, is modified during transient conditions. Thus, if the criterion value of the desired pump speed is changing, as it will do if the level in the wet well is continuing to rise or fall, there will be a flow of current that will change the state of charge of a capacitor. Whenever the accumulated charge is not zero, an auxiliary control current augments that provided by the difference between the voltage signal of the potentiometer and the feedback signal or tachometer signal. This auxiliary current is used to provide a temporarily exaggerated change in pump speed. However, when the capacitor charge decays, only the normal or steady state type of control remains for maintaining the pump speed that is needed for equilibrium conditions.

BRIEF DESCRIPTION OF THE DRAWING

The single figure constituting the drawing is a schematic representation of a sewage pumping system embodying our inertia stabilization control.

DESCRIPTION OF THE PREFERRED EMBODIMENT

The sewage system selected for the purpose of exemplifying the invention has been designated generally by the reference numeral 10. Such a pumping system typically includes a wet well 12 and an adjacent dry well 14. The sewage inflow, the rate of which may fluctuate quite widely, to the wet well 12 is through a conduit 16. A centrifugal pump 18 is located in the dry well 14 but has its intake 20 extending into the wet well. The discharge side of the pump has been labeled 22 and is connected to a relatively long force main or conduit 24 composed of an indeterminate number of pipe sections. The conduit 24 may have a moderate length or a length on the order of several, perhaps even ten, miles and therefore the liquid body or column contained therein represents an appreciable mass, the inertia of which must be overcome for each velocity change. It will also be recognized that the conduit 24 may slope upwardly in reaching the disposal site labeled 26, thereby necessitating an unsymmetrical relationship between the accelerating and decelerating forces on the liquid mass. The present invention makes provision for this type of conduit profile.

It will be recognized that the wet well 12 and the conduit 24 collectively constitute a passage means in the pumping system 10. However, the demanded or desired quantity of liquid in the wet well 12 will not always correspond to the quantity of liquid actually supplied or present. When the level of the liquid in the wet well 12 is within predetermined upper and lower limits, the pump 18 is operating at a speed to meet the demand and the system is in an equilibrium state. In other words, the quantity of liquid that is desired within the well 12, due to the physical size of the well, is what is present and only a normal control over the pump speed need be exercised. On the other hand, should the liquid level rise or fall appreciably, the actual quantity in the well is no longer the demanded or desired quantity, and a condition of nonequilibrium then exists and a greater than normal change in pump speed is required. As the description proceeds, it will become apparent that the present system 10 quickly returns the system, that is, the liquid flowing in the passage means comprised of the well 12 and conduit 24, to a condition of equilibrium, doing so whether there has been an appreciable rise in the level of liquid in the well 12 or an appreciable drop in its level.

A three-phase squirrel cage induction motor 28 so constructed that its speed is changed with the applied voltage is employed in the depicted situation, recent motor design and control innovations allowing and encouraging such motors for pump drives. As an illustration of a specific sensing means, a conventional tachometer 29 is mechanically coupled to the shaft of the motor 28 and generates a direct current voltage representative of the motor speed at any given moment. A feedback signal generated by the pressure of the pump may be used to generate a signal that indicates the output speed of the motor. Actually, though, the system is susceptible to using various types of motors, and in the past, wound rotor motors have been extensively utilized. Since the particular type of motor control is not crucial to an understanding of the invention, a typical motor speed control device 30 has been rather generally illustrated. It is important, however, to note that first and second control coils 32 and 34 are employed. Since a three-phase motor 28 is contemplated, there will be three pairs of such coils 32, 34. Each pair of coils 32, 34 is connected in circuit with a firing module 36A, 36B and 36C, here again there being one such module for each phase. It is not believed necessary to show the circuit details of the firing modules 36A, 36B and 36C, especially since satisfactory ones are currently available on the open market, such as model R213C322 available from Firing Circuits, Inc., a division of Marathon Electric Mfg. Corp., Norwalk, Conn., and shown in their Bulletin 5,000, September 1966. The firing modules 36A, 36B and 36C trigger a pair of SCR's (silicon controlled rectifiers) 38 and 39, there being a pair of such rectifiers for each module as diagrammed in the drawing. It will be perceived, though, that the cathode of the silicon controlled rectifier 38 in each instance is joined to the gate of the silicon controlled rectifier 38, and the gate of the rectifier 39 is joined to the cathode of the rectifier 39, the junction thus formed in turn being connected to the stator of the induction motor 28. Thus, each module 36A, 36B and 36C by reason of the magnitude of control current in the coils 32 and 34 and their respective connections to the cathodes of the rectifiers 38 and 39, control the moment in an alternating current cycle at which the various rectifiers start to conduct, thereby adjusting the amount of voltage supplied to the induction motor 28 and producing related speed and torque variations in the pump impeller.

Since the liquid level in the wet well 12 is to be maintained within upper and lower limits, a conventional bubbler 40 has been diagrammatically illustrated. A small compressor 42 forces air through a horizontal tube 44 into a vertical tube 46 which is open at its lower end 48. Closing the upper end of the vertical tube 46 is a bellows 50 which serves as a pressure transducer. Stated somewhat differently, when the depth of the liquid labeled 52 in the wet well 12 increases, this being by reason of an increased amount of inflow through the conduit 16, the bellows 50 will experience a greater amount of pressure therewithin because the air passing out through the open end 48 will encounter a greater head and the bubbles 54 will require a greater pneumatic pressure to be released over that required when the liquid 52 has a lower level. Thus, the bellows senses the level of the liquid 52.

The bellows 50 acts against one end of a pivotal beam 56 which is fulcrummed at 58. The other end of the beam 56 has attached thereto a coil spring 60. The upper end of the coil spring 60 is connected to a threaded shaft 62 which is retracted and advanced through the medium of a driven gear 64 which is in mesh with a driving gear 66 mounted on one end of a shaft 68 connected to an auxiliary motor 70. When the motor 70 is rotated in one direction, the retraction of the shaft 62 in the direction of the upwardly directed arrow 72 causes the tension in the spring 60 to be increased, whereas rotation of the motor 70 in a reverse direction will cause the shaft to be advanced downwardly in the direction of the arrow 74 so as to decrease the tension in the spring 60. A battery 76 provides power for the motor 70 and a first field winding 78 causes the shaft to move in the direction of the arrow 72 and a second field winding 80 when energized causes the shaft to move in the direction of the arrow 74.

At this time, attention is directed to a contact arm 82 integral with the beam 56. The contact arm 82 functions as a common contact and is electrically grounded at 84. The contact arm 82 is cooperable with a pair of switch contacts 86 and 88, the contact 86 being engaged by the arm 82 when the beam 56 pivots sufficiently about the fulcrum 58 in a clockwise direction, whereas the contact 88 is engaged when the beam 56 pivots in a counterclockwise direction. As can be readily seen from the drawing, the contact 86 is in circuit with the winding 78 and the contact 88 is similarly in circuit with the winding 80, there being a connection to ground through the motor and the battery 76 whenever the contact arm 82 engages the contact 86 or the contact 88. In either event, the motor 70 will rotate, and the force applied to the end of the beam 56 through the coil spring 60 can be increased or reduced, as the case may be, by an extension or contraction of the spring. In this way, a condition of equilibrium can be restored after the motor 70 has rotated for a sufficient period of time. For instance, if the level of the liquid 52 in the wet well 12 rises sufficiently, then the pressure within the bellows 50 increases and the beam 56 is caused to rotate in the aforementioned clockwise direction which results in the contact arm 82 engaging the contact 86. This will cause the tension in the spring 60 to be increased, for the shaft 62 is retracted in the direction of the arrow 72. It will be appreciated that the contact 86 can be initially spaced any preferred distance from the contact arm 82 so that the beam 56 must rotate or pivot either to a lesser degree or a greater degree, depending upon the spacing of the contact 86; the same holds true for the contact 88. Thus, if the spacing of the contacts 86 and 88 from the central position of the contact arm 82 is quite great, the liquid 52 can rise more and fall more than if the spacing is of a lesser magnitude.

A potentiometer 90, or other electromechanical transducer such as a differential transformer, includes a resistance element 92 and a wiper 94 mounted on the shaft 62 so that it is retracted or advanced in unison with the shaft. Consequently, the wiper 94 will assume various positions along the resistance element 92. The potentiometer 90 is energized via a battery 96 having its positive side grounded. Therefore, in restoring the beam 56 and associated contacts to their central or noncontacting position, there will be a resulting displacement of the wiper 94 across the resistance element 92. The position of the wiper 94 is representative of the pressure within the bellows 50 over the complete range of pressures which are to be encountered by the pressure developed in the vertical tube 56 for the entire depth of variation of the liquid 52 in the wet well 12. The battery 96 connected across the resistance element 92 of the potentiometer 90 will therefore allow a voltage to exist between the grounded positive side of this battery and the wiper 94, this voltage being proportional to the pressure experienced by the bellows 50. This voltage is, in the absence of any feedback voltage from the tachometer 29 or other sensing device designed to provide a feedback signal, impressed across the control coil 32 of the motor speed control device 30. As hereinbefore explained, the motor 28 is a special three-phase motor and therefore there is one control coil 32 for each phase, but it facilitates the description to refer to only one coil 32. When the pump 18 is rotating at some fixed speed, the voltage developed by the tachometer 29 or feedback arrangement will oppose the voltage sensed by the wiper 94 of the potentiometer 90. However, some small but finite voltage will remain as the difference between the potentiometer developed voltage and the tachometer developed voltage. The motor speed control device 30 will provide a particular value of motor speed in consequence of this smaller voltage and more particularly in consequence of the current which this voltage causes to flow in the coil 32. It will be appreciated that the current in the control coil 32 becomes the criterion for the desired speed of the motor 28 and allows adjustment of the motor speed over a considerable range by the variation of this current. Accordingly, there will be approximately a proportional variation of current through the coil 32 with respect to the position of the wiper 94 and in this way the depth of the liquid 52 in the wet well 12 will be controlled as long as the inflow through the conduit 16 is constant or varies at a relatively slow rate.

The above description therefore relates to a condition of flow equilibrium where the inflow through the conduit 16 and the liquid volume being pumped by the pump 18 are equal and there is no appreciable change in the depth of the liquid 52 in the wet well 12. In this condition of equilibrium, the auxiliary motor 70 will not be stimulated into action and the pump speed will continue at the desired speed to maintain the particular prevailing level of the liquid 52 in the wet well 12. Of course, a small rise or fall of the liquid 52 can be tolerated because of the volumetric capacity of the wet well and the spacing between the contacts 86 and 88, but a considerable variation in the inflow through the conduit 16 will require a change in the pump speed in order to pump at a greater or lesser rate. Summarizing now what transpires when the inflow increases steadily, a decrease being discussed hereinafter, there is consequent increase in the depth of the liquid 52 since not enough time will have elapsed for the pump 18 to take care of the excess that has been acquired by the wet well 12. Inasmuch as the level of the liquid 52 increases under these circumstances, the pressure experienced in the bellows 50 will likewise increase and the beam 56 will be rocked in a clockwise direction to cause the contact arm 82 to engage the contact 86, thereby energizing the field winding 78 and causing the motor 70 to rotate in a direction to retract the shaft 62 as indicated by the arrow 72. This results in an increase in the tension of the coil spring 60 and also the voltage appearing between the wiper 94 and its grounded end will increase; since the depth of the liquid 52 has increased, the speed of the pump 18 should be increased. Due to the fact that a greater voltage appears between the wiper 94 and ground, this will increase the excitation of the control coil 32 and there will be more power delivered to the motor 28 via the firing modules 36A, 36B and 36C.

As has previously been indicated, though, due to the inertia of the liquid in the force main or conduit 24, there may be no immediate increase in the pump discharge volume, the impeller of the pump 18 merely slipping and not increasing the velocity of the large column of liquid to be moved. In other words, there is a disparity between the inflow and outflow of sufficient magnitude that a nonequilibrium flow condition arises. It is for this reason that a transient control circuit 104 is incorporated into the pumping system and functions to provide a current in a second control coil 34 of the motor speed control device 30 which will effect an appreciable increase (or appreciable decrease as described later) in the speed of the motor 28 and hence the speed of the pump 18. It is, therefore, the role of the coil 34, there being one for each phase, to produce temporary variations in the speed control for the motor 28. Whereas the coil 32 is energized or excited in accordance with the steady state pumping requirement, the coil 34 is excited so as to take care of transient conditions. This is done by magnetic circuit summation, the individual effects of the coils 32 and 34 being additive. In other words, whatever degree of excitation is present as far as the coil 32 is supplemented by the excitation furnished by the coil 34. It is the function of the circuit 104 to provide suitable temporary control signals for the coil 34 and thus introduce into the system the desired inertia stabilization.

In the accomplishment of the above aim, a first transistor 106 and a second transistor 108 are employed. The transistor 106 is of the PNP type and the transistor 108 being of the NPN type. Both transistors are normally saturated or conducting, being rendered conductive by virtue of the currents supplied to their bases through resistors 105 and 107 by the batteries 110 and 112, respectively. The emitter-collector circuit of the transistor 106 is in parallel with the charging voltage source for capacitor 114, and the transistor 108 is similarly connected in parallel with the charging voltage source for capacitor 116. With the transistors 106 and 108 both conducting, there will be no voltage available to provide a charging current for either capacitor 114 or 116. A charging path, however, is made available through resistors 118, 119 and a diode 120 when the transistor 106 ceases conducting and the capacitor 114 receives a charge. Similarly, a charging path is provided through resistors 122, 123 and a diode 124 when the transistor 108 ceases conducting and the capacitor 116 receives a charge. A discharge path is furnished for the capacitor 114 through the conducting transistor 106, an adjustable resistor 126 and a diode 128, and similarly a discharge path is provided for the capacitor 116 through the conducting transistor 108, an adjustable resistor 130 and a diode 132, these discharge paths being described with greater particularity hereinafter. At this time, attention is directed to a first pair of normally nonconducting PNP transistors 134 of the same type as the transistor 106 and a second pair of transistors 136 of a complementary NPN type which correspond to the conductivity type of the transistor 108. All four of these transistors, it should be borne in mind, are normally nonconducting.

The circuit 104 further includes an adjustable resistor 138 connected to the negative side of the battery 110 and establishing a circuit to the firing module 36A so that the coil 34 is included in the conductive path as are the coils 34 for the modules 36B and 36C since the coil 34 for the module 36C is grounded. In this way, a selectable value of bias current is furnished to the coil 34 in each phase even when the transistor portion of circuit 104 has not been enabled. This bias current may be utilized to establish a minimum pump speed in combination with the current supplied coil 32 from the voltage difference between the potentiometer 90 and the tachometer 29 or the equivalent of a tachometer in the form of a device providing a feedback signal originating from pump pressure.

The temporary or transient control currents and the bias current from circuit 104 are supplied through the agency of an adjustable resistor 140 which is connected to the emitters of the second transistor 134 and the second transistor 136. It might be explained at this stage that the pair of transistors 134 and the transistors 136 are connected in what is known as a Darlington configuration which is employed to minimize the current taken from the capacitors 114 and 116 by the transistors.

It has already been explained that the transistors 106 and 108 are normally saturated, and in this state, any charge on either capacitor 114 or 116 gradually decays to zero. Since the base of the transistor 106 is connected directly to the contact 100 that is engaged by the contact arm 82 when the beam 56 is rocked in a clockwise direction due to an increase in pressure within the bellows 50, then when this occurs due to an increase in the level of the liquid 52 in the wet well 12, the base and emitter of transistor 106 will be shorted to one another with the consequence that this transistor ceases to conduct. Whereas previously the transistor 106 was providing a low impedance path in shunt or parallel with charging voltage source for the capacitor 114, the high impedance path provided by cutting off the conduction of the transistor 106 results in the capacitor 114 starting to be charged due to the connection of the negative side of the battery 110 thereto via resistor 119. The charging takes place through the resistors 118 and 119 and diode 120 from the negative side of the battery 110.

In the absence of a charge on the capacitor 114, the excitation supplied to the coil 34 was only from the battery 110 through the adjustable resistor 138. This circuit path resulted in a certain fixed excitation of the coil 34 and consequently the motor 28 had its speed governed by the magnetic summation of the ampere turns provided by currents in coils 32 and 34. All control variations were thus derived via the coil 32 from the position of the wiper 94 on the potentiometer 90.

The charging of the capacitor 114 by virtue of the contact arm 82 engaging the contact 100 as has been described indicates a changing liquid level or a disturbed flow situation which requires an abruptly increased speed for the motor 28 in order to restore the system to a condition of flow equilibrium. Since the transistor 106 is now cut off, the charging of the capacitor 114 continues with the time constant of the circuit determined solely by the values of the capacitor 114 and the resistors 118 and 119. These are selected so that the capacitor 114 will charge at a relatively rapid rate. The specific rate will be related to how quickly the motor 70 can restore the beam 56 to its equilibrium position. The presence of a charge on the capacitor 114 causes some base current to the first transistor of the pair labeled 134 and the resulting emitter current in this transistor will provide base current to the second transistor whose emitter current flowing through the adjustable resistor 140 augments the current being supplied via the adjustable resistor 138. This will appreciably increase the control current in the coil 34 and the magnetic summation that takes place will result in the various modules 36A, 36B and 36C causing the SCR's 38 and 39 to fire earlier in each cycle so as to increase the power supplied to the motor 28 and thereby speed up the motor to a much greater speed than that called for by the amount of the steady state control currents previously described.

The transient speed increase that occurs will be proportional to the charge on capacitor 114 and will continue to occur after the transistor 106 is returned to its conductive state. The exponential decay of the charge on capacitor 114 will be accompanied by an equivalent exponential decay of the control current flowing in coil 34. The rate of this decay may be adjusted by the variable resistor 126 to a reasonably close approximation to cause a temporary or transient increase in speed in the motor to accelerate the liquid mass in the conduit 24. Thus, the resulting temporary increase in pump speed may be tailored in both magnitude and duration to best suit each particular installation where this invention is employed.

To review this situation, as soon as equilibrium is restored between the bellows 50 and the coil spring 60, the contact arm 82 separates from the contact 100 and also from the contact 86. The motor 70 stops by reason of the separation of the contact arm 82 from the contact 86, but it is to be noted that the separation of the arm 82 from the contact 100 causes the transistor 106 to be driven into its saturated state once again. This provides a discharge path through the resistor 126 and the diode 128 which permits the capacitor 114 to start discharging. The charge on the capacitor 114 thus leaks off through the resistor 126, the diode 128 and the now saturated transistor 106, the discharge rate being influenced by the amount of resistance in the path. It has already been pointed out that the resistor 126 is adjustable and hence the time for the capacitor 114 to discharge can be adjusted to suit the particular operating circumstances. In this way, the current contribution from the transistors 134 is progressively reduced until finally the current through the adjustable resistor 140 reaches zero as the charge on the capacitor 114 approaches zero. This causes the speed of the pump 18 to be gradually reduced until it ultimately returns to the normal or desired speed that is presently dictated by the currents in the coils 32 and 34. It will be understood that the amount of resistance in the adjustable resistor 140 can be selected for the particular pumping system. Thus, considerable versatility is imparted in the control exerted by the transient control circuit 104.

In the situation just described above, it has been assumed that the inflow through the conduit 16 had increased to cause a condition of non-equilibrium, the level in the wet well 12 thereby rising. Although the control by the circuit 104 in an opposite situation, that is, where the inflow is decreasing, should be readily understood, nonetheless a brief operational sequence will be given for this condition of non-equilibrium.

Under these circumstances, the equilibrium of the beam 56 is upset in an opposite direction, the beam rocking in a counterclockwise direction to cause engagement of the contact arm 82 with the contacts 88 and 102. The contact 88 is in circuit with the field winding 80 and thereby causes the motor 70 to rotate in a reverse direction than in the preceding situation. This causes a relaxing of the tension of the coil spring 60, for the shaft 62 is advanced in the direction of the arrow 74. In other words, the spring 60 becomes more contracted and reduces its force contribution on the beam 56, this ultimately resulting in the restoration of an equilibrium condition which will open or disengage the contact arm 82 from the contact 102 and also the contact 88.

During the time the contact 102 is grounded via the arm 82, base current for the transistor 108 no longer flows and the transistor becomes non-conducting. The nonconductive state of the transistor 108 causes the capacitor 116 to be charged through the charging path furnished by the resistors 122 and 123 and the diode 124. This in turn causes the normally nonconductive transistors 136 to become increasingly conductive with the consequence that current is supplied through the adjustable resistor 140 in an opposite direction due to the polarity connection of the battery 112, and the employment of complementary transistors to those used for the increasing portion of the circuit.

Under steady state or equilibrium conditions, the resistor 138 governs the control current flowing in coil 34, but when current is passed via transistors 136 and resistor 140, the current in coil 34 is reduced and the motor speed is decreased appreciably to effect a more rapid deceleration of the large mass of liquid contained in the conduit 24. Hence, the circuit 104 now operates in an inverse manner to restore the pump speed to a steady state by the reverse flow of current through the resistor 140.

Under this set of circumstances, when the beam 56 is returned to a neutral or equilibrium condition, the opening of the circuit involving the contact 102 will cause the transistor 108 to become conductive again and the discharge path provided through the conducting transistor, the resistor 130 and the diode 132 will cause the charge that has been accumulated on the capacitor 116 to decay exponentially. Here again, the amount of resistance in the resistor 130, which is adjustable, will influence the time it takes to discharge the capacitor 116. Consequently, the period of time during which an exaggerated or transient speed reduction takes place to decelerate the speed of the motor 28 and the pump 18 can be adjusted to the particular requirements of the installation, which is dependent on the inertia of the fluid in the conduit 24.

The existence of separate capacitors 114, 116 and their separate discharge paths through the resistors 126 and 130, respectively, permit an arbitrary and independent selection of the rate of discharge of these capacitors following a disparity excursion in either direction and thereby the rate of return of the speed of the pump 18 to its steady state or equilibrium condition. This feature has a decided advantage where the conduit 24 may have an inclination or upward slope imparted thereto so that an increase in pump speed should be for a longer temporary period than any decrease in pump speed. More specifically, where there is an inclination to the conduit 24, the pump 18 must work against the gravitational pull and in order to overcome the inertia that is then involved, the accelerated speed must be maintained for a longer period than where a decrease from a normal pump speed is to be provided. Consequently, where the inflow through the conduit 16 increases abruptly, and there is an inclination to the conduit 24 throughout its relatively long length, the resistor 126 can be adjusted so that the discharge of the charge on the capacitor 114 is slower than that of the capacitor 116, the capacitor 116 controlling the pump speed for a decrease in inflow through the conduit 16.

While the preceding description of the inertia stabilization control has employed a sewage pumping system for illustrating its performance, it should be emphasized that the same control effects are required in a water supply system of a large capacity and that the control described may be utilized to provide them. For example, the pressure in a municipal water supply system is usually derived from the gravity head of an elevated tank wherein the level of the water determines the pressure available for the users. When the water supplied to the storage tank must be pumped through a long conduit, the same problems of accelerating and decelerating the large mass of liquid prevail.

If, in the preceding illustration, the pressure of the water (or its level, since they are interdependent) were applied to the bellows 50, an exactly analogous set of conditions would apply as has been described in the control of the pump speed for maintaining the desired level in the storage tank. It is only necessary to reverse the effects of the potentiometer 90 and the inertia stabilization circuit 104 so that increases in pressure cause decreases in the pump speed and vice versa.

By way of brief explanation, when the bellows 50 senses a pressure representing a rise in liquid level, there will be a resulting clockwise rocking of the beam 56 which now should cause both a steady state and a transient decrease in pump speed. On the other hand, if the level of the liquid in the storage tank decreases due to an increase in water usage, then the bellows 50 will contract sufficiently so the contact arm 82 engages the contacts 88 and 102. This now must result in both a steady state and a transient increase in pump speed. In either case, the steady state speed change is accompanied by a temporary or transient speed change of the same kind but of an adjustable magnitude and duration thereby to overcome the inertia of the liquid mass within the long conduit and to more rapidly restore the requisite liquid flow condition in the pump discharge to match that produced by the variation in the amount leaving the storage vessel. The described actions are achieved by merely interchanging the connections to the beam contacts 86 and 88 and the contacts 100 and 102.

Also, in a water supply system, the disposal site 26 could be thought of as a consumption site and then would constitute a location at which the actual supply might differ from the amount of water desired. For instance, should the demand increase appreciably, the pump 18 would have to pump at a faster rate. With, say, a column of liquid approximating ten miles or so, the inertia of the water in the conduit 24 would be very great. Since a demand situation would then exist that would be different from the quantity actually present or supplied at the moment, the pressure at the consumption site would decrease and a sensing of such reduced pressure would indicate that the pump 18 should speed up appreciably via the circuit 104 to return the water supply system quickly to a condition of flow equilibrium in which the demand or desired quantity is met from a condition of flow nonequilibrium in which the quantity being supplied or present differs appreciably from the amount desired. Likewise, if the pressure of the consumption site (corresponding to the depicted site 26) increases abruptly, this being the converse situation, the pump 18 should be decelerated quickly to prevent an objectional buildup of pressure in the water system.

We claim:

1. In a pumping system, conduit means, a pump for forcing liquid through said conduit means, first means which adjusts the pump speed at a steady rate to a speed which normally maintains a liquid flow that results in a condition of equilibrium, and second means for adjusting the pump speed at an accelerated rate to produce a second speed appreciably different from said first speed when a condition of nonequilibrium exists involving a flow that differs from said equilibrium flow by a predetermined amount so that the inertia of liquid in said conduit is rapidly overcome and said condition of equilibrium is quickly restored.

2. A pumping system as set forth in claim 1 in which the pump is returned to a steady state speed at a slower rate than the accelerated rate at which the pump is adjusted in producing its said second speed.

3. A pumping system as set forth in claim 2 in which the rate at which the pump is returned from said second speed to said steady state speed is different when said second speed is greater than said first speed as compared to when said second speed is less than said first speed.

4. In a pumping system, a conduit, a pump for forcing liquid through said conduit, a variable speed electric motor for driving said pump, first means for controlling the speed of said motor so that said pump pumps at a rate to maintain a condition of equilibrium in the system, and second means responsive to a condition of nonequilibrium for temporarily changing the speed of said motor to an appreciably different speed to more rapidly overcome the inertia of the liquid in said conduit and thereby more quickly reduce the amount of nonequilibrium.

5. A pumping system as set forth in claim 4 in which said second means includes a circuit having a capacitor therein that is charged in response to said condition of nonequilibrium to inaugurate said temporary speed change.

6. A pumping system as set forth in claim 5 in which the charging of said capacitor is initiated after a predetermined amount of nonequilibrium has occurred.

7. A pumping system as set forth in claim 6 in which the rate at which said capacitor is charged influences the rate at which said motor speed is changed.

8. A pumping system as set forth in claim 7 in which said capacitor is discharged after the amount of nonequilibrium has been reduced to a predetermined amount.

9. A pumping system as set forth in claim 8 in which the rate at which said capacitor is discharged determines the rate at which the speed of said motor is changed back toward its flow equilibrium speed.

10. A pumping system as set forth in claim 9 in which the charging rate of said capacitor is faster than its discharging rate.

11. In a pumping system, a conduit, a pump for forcing liquid through said conduit, an electric motor for driving said pump, a motor speed control device in circuit with said electric motor for varying the speed of said motor and hence the speed of said pump, said speed control device having first and second control coils, first means in circuit with said first coil for providing a voltage having a magnitude representative of a desired motor speed which will cause said pump to maintain a normal condition of flow equilibrium, second means also in circuit with said first coil for providing a voltage having a magnitude representative of the actual speed of said motor, said first and second means being connected in opposition so that the difference between their voltages appears as a steady-state control signal across said first coil to energize said motor speed control device to drive said motor at said desired speed, and a transient speed control circuit connected to said second coil and responsive to a predetermined condition of nonequilibrium in the system so as to provide a transient control signal across said second coil, said first and second coils being disposed so as to accomplish electromagnetic summation of the steady-state and transient control signals with the consequence that said motor speed control device is energized so as to change the speed of said motor to an abnormal speed to thereby more rapidly overcome the inertia of liquid contained in said conduit and thus restore the system more quickly to its said normal condition of equilibrium.

12. A pumping system as set forth in claim 11 in which said first means includes a movable element, means for positioning said element so as to provide said voltage which is representative of said desired motor speed, and means associated with said positioning means for rendering said transient speed control circuit operative when said desired motor speed fails to maintain said condition of equilibrium.

13. A pumping system as set forth in claim 12 including a pivotal beam, a coil spring connected between said movable element and one end of said beam, a transducer responsive to flow conditions within the system acting on the other end of said beam, and means operable by said beam for rendering said transient speed control circuit operative when said beam is rocked through a predetermined angle which angle is indicative of said predetermined condition of flow nonequilibrium.

14. A pumping system as set forth in claim 13 in which said transient speed control circuit includes a capacitor, means for charging said capacitor while said last-mentioned means are actuated by said beam, and circuit means responsive to the current charging said capacitor for providing said transient control signal across said second coil.

15. In a pumping system, a conduit, a wet well for receiving a variable inflow of liquid, a pump for pumping liquid from said wet well into said conduit, a pressure transducer for representing the depth of liquid in said wet well, a pivotal beam, said transducer acting on one end of said beam, a coil spring having one end attached to the other end of said beam, electrical means including a movable element connected to the other end of said coil spring, an auxiliary electric motor for advancing and retracting said movable element, first contact means actuated by said beam to cause said auxiliary motor to rotate in a direction to retract said movable element so as to increase the tension in said coil spring when said transducer senses a depth of liquid that is too high, second contact means actuated by said beam to cause said auxiliary motor to rotate in an opposite direction to advance said movable element so as to decrease the tension in said coil spring when said transducer senses a depth of liquid that is too low, means for supplying a direct current potential to said electrical means, whereby the displacement of its said movable element is representative of the pressure to which said transducer is subjected and hence the depth of liquid in said wet well, a main electric motor drivingly connected to said pump, a motor speed control device for controlling the speed of said pump, said device having first and second control coils, sensing means for providing a direct current voltage signal representative of the actual speed of said motor, means connecting said electrical means and sensing means in circuit with said first control coil so that the signal developed by said sensing means opposes the signal developed by said electrical means with the consequence that said first coil is excited to the extent necessary to cause said motor speed control device to produce a speed of said main motor and pump that will maintain a condition of flow equilibrium as long as the inflow of liquid to said wet well is constant or varies at a steady rate, third contact means actuated by sufficient movement of said beam when said beam pivots in a direction to actuate said first contact means, fourth contact means actuated by sufficient movement of said beam when said beam pivots in a direction to actuate said second contact means, first and second capacitors, means for charging said first capacitor when said third contact means is actuated, means for charging said second capacitor when said fourth contact means is actuated, means responsive to the charging of said first capacitor for exciting said second control coil to the extent necessary to cause said motor speed device to produce an appreciably greater speed of said main motor and pump that will more rapidly overcome the inertia of liquid in said conduit and thereby more quickly increase the pumping rate to restore said condition of equilibrium, and means responsive to the charging of said second capacitor for exciting said second control coil to the extent necessary to cause said motor speed device to produce an appreciably reduced speed of said main motor and pump that will more rapidly overcome the inertia of liquid in said conduit and thereby more quickly decrease the pumping rate to restore said condition of equilibrium.

16. A pumping system as set forth in claim 15 including means for discharging said first capacitor when said beam ceases to actuate said third contact means, and means for discharging said second capacitor when said beam ceases to actuate said fourth contact means.

17. A pumping system as set forth in claim 16 including means for varying the discharge rate of said first capacitor, and means for varying the discharge rate of said second capacitor, whereby the period at which said motor operates at either its said appreciably increased speed or its appreciably decreased speed may be selected.

18. A pumping system as set forth in claim 17 including a first normally conducting transistor in parallel with said first capacitor, means controlled by the actuation of said third contact means for causing said first transistor to become nonconductive and thereby start the charging of said first capacitor, a second normally conducting transistor in parallel with said second capacitor, means controlled by the actuation of said fourth contact means for causing said second transistor to become nonconductive and thereby start the charging of said second capacitor.

19. A pumping system as set forth in claim 18 in which said means for varying the discharge rate of said first capacitor is in circuit with said first transistor so that the discharge path for said first capacitor is through said first transistor when said first transistor is conducting, and in which said means for varying the discharge rate of said second capacitor is in circuit with said second transistor so that the discharge path for said second capacitor is through said second transistor when said second transistor is conducting.

20. A pumping system as set forth in claim 19 including a first pair of normally nonconducting transistors rendered conductive by the charge on said first capacitor for causing said second control coil to be excited to produce said appreciably greater motor speed, and a second pair of normally nonconducting transistors rendered conductive by the charge on said second capacitor for causing said second control coil to be excited to produce said appreciably reduced motor speed.

21. A pumping system as set forth in claim 20 including means in circuit with said second control coil for adjusting the amount of excitation of said second control coil when said first and second pairs of transistors are nonconductive, and means in circuit with said first and second pairs of transistors and said second control coil for adjusting the amount of excitation of said second control coil when either of said pairs of transistors is conductive.

References Cited

UNITED STATES PATENTS

| | | | |
|---|---|---|---|
| 2,253,859 | 8/1941 | Mantle | 230—12 |
| 2,944,488 | 7/1960 | Meyer | 103—35 X |
| 2,950,682 | 8/1960 | Kimmel | 103—35 X |
| 2,966,120 | 12/1960 | Morrow | 103—35 X |
| 3,021,789 | 2/1962 | Ryden | 103—35 |
| 3,097,606 | 7/1963 | Finzel | 103—35 X |
| 3,123,005 | 3/1964 | Bredehoeft et al. | 230—12 X |
| 3,213,795 | 10/1965 | Parks et al. | 103—35 |
| 3,294,024 | 12/1966 | Meyers et al. | 103—21 |
| 3,393,642 | 7/1968 | Kordik et al. | 103—35 |

DONLEY J. STOCKING, *Primary Examiner.*

WARREN J. KRAUSS, *Assistant Examiner.*

U.S. Cl. X.R.

137—394; 230—12